United States Patent [19]

Castagnos, Jr. et al.

[11] Patent Number: 5,417,932
[45] Date of Patent: May 23, 1995

[54] VENT ORIFICE IN FLUID CATALYTIC CRACKING DIRECT-CONNECTED CYCLONE APPARATUS

[75] Inventors: Leonce F. Castagnos, Jr., The Woodlands; Gary E. Collier; Steven L. Keiner, both of Houston, all of Tex.

[73] Assignee: Texaco Inc., White Plains, N.Y.

[21] Appl. No.: 78,469

[22] Filed: Jun. 21, 1993

[51] Int. Cl.⁶ .............................................. F27B 15/12
[52] U.S. Cl. .................................... 422/147; 55/435; 55/459.1; 422/241
[58] Field of Search ............... 422/241, 147; 55/459.1, 55/345, 267, 435, 423

[56] References Cited

U.S. PATENT DOCUMENTS

| | | | |
|---|---|---|---|
| 1,265,763 | 5/1918 | Fender | 55/459.1 X |
| 3,064,811 | 11/1962 | Mumper | 55/459.1 X |
| 3,273,320 | 9/1966 | Delaune | 55/459.1 X |
| 3,327,456 | 6/1967 | Guber, Jr. et al. | 55/459.1 X |
| 3,470,678 | 10/1969 | Clark et al. | 55/459.1 X |
| 4,125,385 | 11/1978 | Rado et al. | 55/459.1 X |
| 4,229,194 | 10/1980 | Baillie | 55/459.1 X |
| 4,357,152 | 11/1982 | Duske et al. | 55/435 X |
| 4,479,817 | 10/1984 | Steever et al. | 55/459.1 X |
| 4,505,051 | 3/1985 | Herchenbach et al. | 422/147 X |
| 5,002,671 | 3/1991 | de Villiers et al. | 55/459.1 X |
| 5,116,394 | 5/1992 | Garkawe | 55/459.1 X |

*Primary Examiner*—Amalia L. Santiago
*Attorney, Agent, or Firm*—James L. Bailey; Kenneth R. Priem; William J. Beard

[57] ABSTRACT

A wear resistant vent orifice is formed by a ring plate member, having erosion protective material at least on the inner annulus thereof, defining the vent orifice between the inner annulus of the ring plate and a tube member passing therethrough.

1 Claim, 1 Drawing Sheet

VENT ORIFICE IN FLUID CATALYTIC CRACKING DIRECT-CONNECTED CYCLONE APPARATUS

BACKGROUND OF THE INVENTION

1. The Field of the Invention

The present invention pertains to the formation of a vent orifice in fluid catalytic cracking direct-connected cyclone apparatus.

2. The Prior Art

Patent application Ser. No. 07/811,729, filed Dec. 23, 1991, now U.S. Pat. No. 5,248,411, the disclosure of which is incorporated herein by reference, describes an apparatus for rapidly separating catalyst from a cracked hydrocarbon gas in a fluidized catalytic cracking (FCC) unit. It also describes a process for withdrawing stripper gas from an FCC reactor vessel. A unique feature of the described invention is the location of the vent orifice for reactor and stripper gasses in an annular space formed around the reactor cyclone outlet tube and the roof of the reactor cyclone. This location for the vent orifice has been shown to have a unique advantage over systems practiced by others in the operation and pressure balance of direct-connected cyclone systems.

In the direct-connected cyclone system the vent orifice may serve as an expansion connection between the first stage reactor cyclone and the second stage or upper cyclone. In this case, freedom of movement between the reactor cyclone outlet tube and cyclone roof must be maintained. Sizing of the vent orifice and maintenance of the vent orifice clearance is critical to maintaining proper operation of the direct-connected cyclone during an extended run on an FCCU. The tolerances required to maintain the proper pressure balance in the system are very small. For example, in one system, the width of the annular gap of the vent orifice is only about 20 mm. In some designs it may be necessary to provide for lateral expansion which exceeds the width of the gap between the cyclone outlet tube and cyclone roof. In other words, when the gap is designed for the proper pressure drop, there may not be enough tolerance or clearance to provide for lateral expansion.

The process of fluid catalytic cracking (FCC) comprises mixing hot regenerated catalyst with a hydrocarbon feedstock in a transfer line riser reactor under catalytic cracking reaction conditions. The feedstock is cracked to yield gasoline boiling range hydrocarbon as well as degradation products, such as coke which deposits on the catalyst causing a reduction in catalytic activity. Hydrocarbon vapor and coked catalyst are passed from the top of the riser reactor directly to a separator vessel, typically a cyclone separator, wherein catalyst is separated from hydrocarbon. In the FCC art, the separator vessel is termed the reactor vessel. The separated catalyst is passed to a stripper wherein it is contacted with a stripping gas to remove volatile hydrocarbon. Stripped catalyst is then passed to a separate regeneration vessel wherein coke is removed from the catalyst by oxidation at a controlled rate. Catalyst, substantially freed of coke, is collected in a vertically oriented regenerated catalyst standpipe. The catalyst is passed from the standpipe to the riser reactor for cyclic reuse in the process.

U.S. Pat. Nos. 4,623,446 and 4,737,346 to J. H. Haddad et al teach a closed coupled cyclone separator system in the reactor vessel of a fluid catalytic cracking apparatus. Means is provided for blending stripping gas with cracked hydrocarbon as it flows to a directly coupled riser cyclone separator. As shown in FIGS. 7 and 8, the riser reactor conduit is modified to comprise an overlapping downstream portion 118 to provide an annulus between the upstream portion 117 and the downstream portion 118. The annulus is covered by a flat metal ring having orifices 125 in open communication with the reactor vessel, enabling stripping gas to pass into the downstream conduit 118. A riser cyclone dipleg is sized, as seen in FIG. 5, to admit at least a portion of stripping gas from the stripping zone to pass countercurrent to catalyst passing downwardly through the dipleg.

U.S. Pat. No. 4,502,947 to Haddad et al discloses a closed cyclone fluid catalytic cracking catalyst separation method and apparatus. In the closed cyclone, hydrocarbon product and catalyst are passed directly into a cyclone separator from a riser without passing into the atmosphere of the reactor vessel. Avoiding the atmosphere of the reactor vessel reduces both excess catalytic cracking and high temperature thermal cracking.

SUMMARY OF THE PRESENT INVENTION

The present invention concerns constructing and attaching vent orifice forming means in a direct-connected cyclone system. The proposed vent orifice forming means will maintain free movement between the cyclone outlet tube and cyclone roof even when the lateral expansion requirements exceed the available orifice width.

The low wear vent orifice, according to the present invention, is formed by an aperature in the roof of a cyclone, an annular plate of larger outer diameter than the aperature overlying the aperture, erosion protection means covering at least the inner annulus of the annular plate, and an outlet tube mounted passing through the inner annulus defining the vent orifice therebetween.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
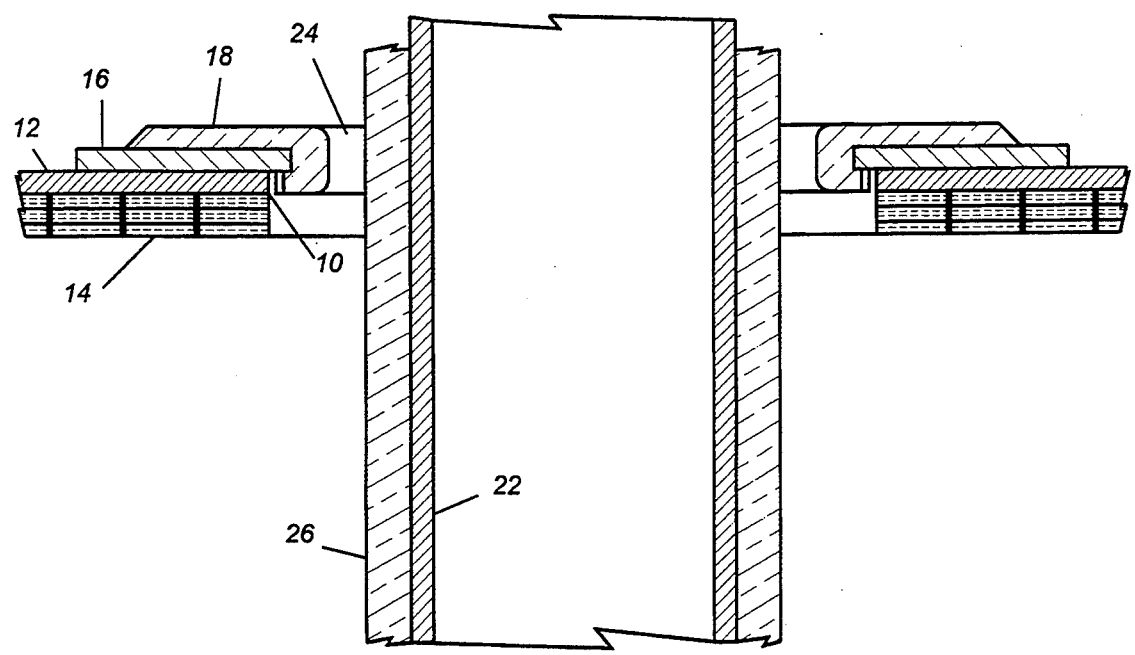
FIG. 1 is a vertical section through a portion of a direct-connected cyclone system incorporating the present invention.

The subject vent orifice forming means will allow an annular gap between a cyclone roof and an outlet tube to be made to tight tolerances from materials that will resist the erosive action of the entering dust laden vapors. The present invention can also provide for lateral and vertical movement between the outlet tube and cyclone roof which movement exceeds the width of the gap.

As shown in the single Figure an opening 10 is formed in a cyclone roof 12 having an inner erosion resistant lining 14. The opening 10 is made larger than the required vent orifice diameter by several inches or more. A ring plate 16 is dimensioned so as to overlap the opening 10 in the cyclone roof 12. A refractory lining 18 with appropriate anchoring system (not shown) (i.e., hexmesh, s-bar, wavy V anchors, etc.) or, as an alternative, an appropriate erosion resistant ceramic material, is applied to the ring plate 16 to protect those areas of the vent orifice directly exposed to the vapors and catalyst flowing at high velocity. The refractory or ceramic lining can then be cured according to the manufacturer's recommendations prior to finish grinding to the close tolerances required.

A cyclone outlet tube 22, which forms the inner wall of the vent orifice annulus 24, is also shop fabricated and refractory or ceramic lined 26. After the refractory or ceramic is properly cured, the outer surface of the outlet tube, in the area which forms the vent orifice, is finish ground to achieve the desired tolerance. The outlet tube can later be field welded to an inlet duct (not shown) of the upper cyclone (also not shown).

Figure 2:
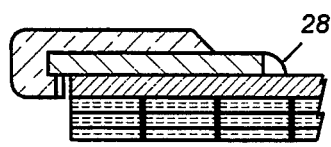
FIG. 2 is a partial detailed segment showing one mode of attachment of the ring plate to the roof.
Figure 3:
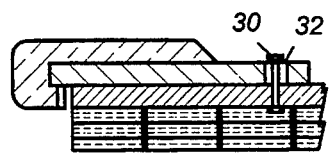
FIG. 3 is a partial detailed segment showing an alternate mode of attachment of the ring plate to the roof.

Three methods are suggested for attachment of the ring plate 16 to the cyclone roof 12. In applications where there is only a small lateral expansion, the ring plate can be attached with a seal weld 28 around the entire outer circumference of the ring plate as shown in FIG. 2. If the lateral movement of the cyclone outlet tube from thermal expansion is greater than can be accommodated by the width of the vent orifice, the plate can be bolted to the cyclone roof with by bolts 30 passing through slotted openings 32 in the ring plate providing for additional movement of the plate as shown in FIG. 3. A third method is to have the ring plate unconnected to the cyclone roof. In this free floating arrangement the surfaces of the plate and cyclone roof are machined to a smooth finish to provide a good metal-to-metal seal. The pressure drop across the vent orifice will hold the plate in contact with the cyclone roof while still allowing the lateral movement of the plate.

The present invention provides the following specific advantages:

1. it allows shop fabrication and repair of the vent orifice without major field work on the cyclone bodies;
2. it allows the vent orifice to be constructed from materials which will resist the erosion of the high velocity gas and catalyst stream;
3. it allows tight tolerances to be maintained on the vent orifice surfaces;
4. it allows for large differential movement of the first and second stage direct-connected cyclones;
5. it allows cyclones to be installed without need of large expansion joints in the outlet tubes or other parts of the riser/cyclone system; and
6. it prevents deformation of the cyclone body due to differential thermal expansion.

The present invention may be subject to many modifications and changes without departing from the spirit or essential characteristics thereof. The present embodiment is therefor intended in all respects to be illustrative and not restrictive of the scope of the invention.

We claim:

1. An apparatus providing a vent orifice in a direct connected cyclone system comprising:

a cyclone having a roof defining an aperture;

an annular plate member having an outer diameter larger than said roof aperture, said plate member lying on said roof in general axial alignment with the aperture therein;

means providing erosion protection covering at least the inner annulus of said plate;

an outlet tube passing through said inner annulus defining a vent orifice therebetween;

a coating of refractory material covering the outer surface of said outlet tube, said refractory material having a polished surface at least in the area passing through said orifice whereby predetermined design clearance tolerance of the vent is achieved; and means fixedly axially securing said annular plate member to said roof in such fashion as to allow limited radial movement therebetween from thermal expansion or contraction.

* * * * *